(12) United States Patent
Sato

(10) Patent No.: US 6,490,232 B2
(45) Date of Patent: Dec. 3, 2002

(54) COMPACT DISC FEEDER

(75) Inventor: Hiromitsu Sato, Matsudo (JP)

(73) Assignee: Nistec Corporation, Chiba-ken (JP)

( * ) Notice: Subject to any disclaimer, the term of this patent is extended or adjusted under 35 U.S.C. 154(b) by 0 days.

(21) Appl. No.: 09/765,844

(22) Filed: Jan. 19, 2001

(65) Prior Publication Data

US 2001/0009534 A1 Jul. 26, 2001

(30) Foreign Application Priority Data

Jan. 26, 2000 (JP) ........................................ 2000-017151
Dec. 27, 2000 (JP) ........................................ 2000-397630

(51) Int. Cl.$^7$ ............................................. G11B 17/22
(52) U.S. Cl. ............................ 369/30.34; 369/30.83; 369/30.85
(58) Field of Search ........................... 369/30.31, 30.32, 369/30.33, 30.34, 30.35, 30.36, 30.37, 30.38, 30.39, 30.4, 30.41, 30.51, 30.52, 30.53, 30.54, 30.55, 30.6, 30.61, 30.87, 30.76, 30.83, 30.85, 191, 194, 30.77

(56) References Cited

U.S. PATENT DOCUMENTS

| | | | | |
|---|---|---|---|---|
| 4,682,313 A | * | 7/1987 | Miyake | |
| 4,730,292 A | * | 3/1988 | Hasegawa et al. | |
| 5,136,562 A | * | 8/1992 | Staar | |
| 5,481,514 A | * | 1/1996 | Yamasaki et al. | |
| 5,729,524 A | * | 3/1998 | Pines et al. | |
| 5,734,629 A | | 3/1998 | Lee et al. | |
| 5,940,355 A | * | 8/1999 | Buckland et al. | |
| 6,075,758 A | * | 6/2000 | Wu | |
| 6,141,298 A | | 10/2000 | Miller | |
| 6,147,960 A | * | 11/2000 | Wolfer et al. | |

FOREIGN PATENT DOCUMENTS

JP        11-185306        9/1999

* cited by examiner

*Primary Examiner*—Ali Neyzari
(74) *Attorney, Agent, or Firm*—Henricks, Slavin & Holmes LLP

(57) ABSTRACT

A housing includes upper and lower holders in which a number of compact discs are stored. An arm is provided so that the proximal end may turn around a vertical shaft in the housing, and the distal end of the arm holds one of the compact discs in the upper holder. The arm turns sideward through an opening of the housing, and lowers along the vertical shaft to transfer the compact disc to a tray which is drawn from a printer. The compact disc is printed in the printer, held by the end of the arm again and transferred to the lower holder in the housing.

6 Claims, 5 Drawing Sheets

COMPACT DISC FEEDER

BACKGROUND OF THE INVENTION

The present invention relates to a compact disc feeder, and especially a compact disc feeder for transferring compact discs in a holder of a housing to a processor such as a printer.

For example, a conventional automatic writing apparatus for writing data into a number of compact discs (CD) or a printer for printing on the surface comprises a CD holder for storing a number of CD and a transfer device for transferring CD from the holder to a processor and conveying the processed CD to the holder one by one.

The conventional automatic writing apparatus and printer has a receiving portion and a transfer device therein to increase size of the whole apparatus, which is too expensive. The foregoing receiving portion and transfer device are used only for the automatic writing apparatus and printer, and cannot be used with another device or for different purposes.

U.S. Pat. No. 5,734,629 discloses a CD transporter in which the automatic writing device and printer are stacked such that the centers of the CD recorder drawers therefrom are aligned on a common axis, the carousel turntable which has a plurality of bins for holding CD being provided thereunder, the bins being selectively matched with the vertical axis by turning the table, one of CD from the bin being fed to the automatic writing appratus or printer, the processed CD being stored into another bin.

In the U.S. Patent, it is advantageous to simplify the CD feeder which comprises only elevating means, but it is blocked by drawing the drawer from the printer to take the CD out of the bin, thereby delaying operation time and requiring drive means for turning the table to make the whole transporter more complicated and larger in size to increase cost, which is disadvantageous.

SUMMARY OF THE INVENTION

In view of the above disadvantages in the prior art, it is an object of the invention to provide a multi-purpose feeder for a compact disc which can be fed and discharged one by one surely to a processor such as an automatic writing device and printer.

BRIEF DESCRIPTION OF THE DRAWINGS

The features and advantages of the invention will become more apparent from the following description with respect to embodiments as shown in the appended drawings wherein.

DETAILED DESCRIPTION OF PREFERRED EMBODIMENTS

The first embodiment of the present invention will be described with respect to FIGS. 1 to 6.

Figure 1:
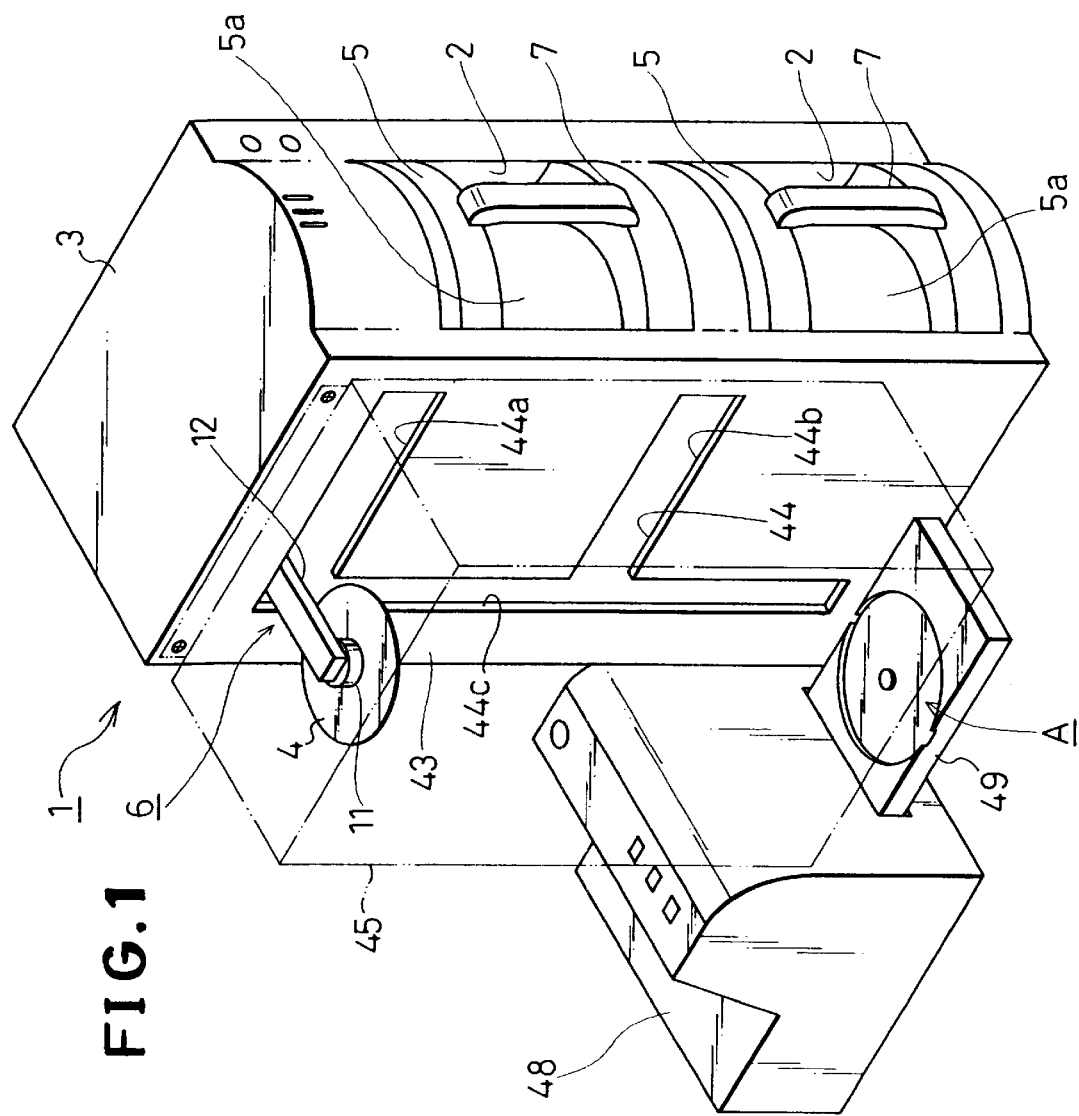
FIG. 1 is a perspective view of the first embodiment of a CD feeder according to the present invention with a printer.
Figure 2:
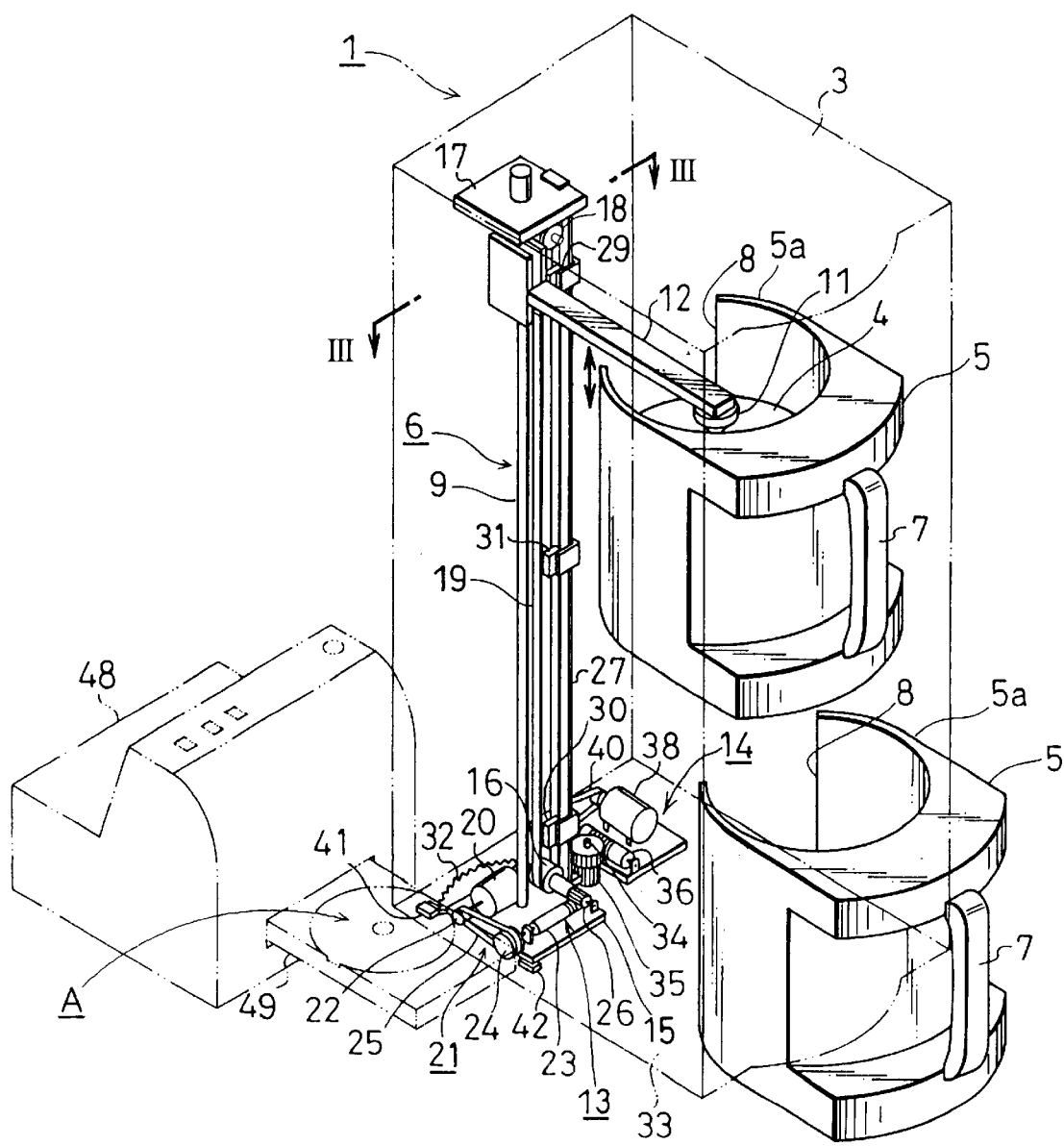
FIG. 2 is a perspective view which illustrates a transfer device.
Figure 4:
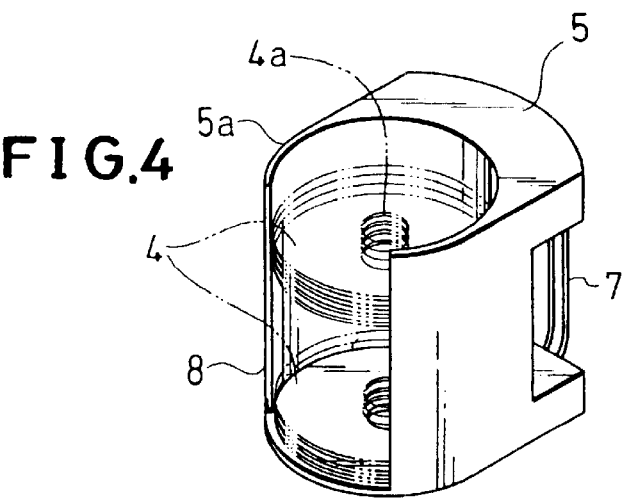
FIG. 4 is a perspective view of a holder.

As illustrated in FIGS. 1 and 2, a feeder comprises a housing 1 which has two holder receivers 2,2 at the front face and a transfer device receiver 3 at the rear portion; two holders 5,5 detachably mounted to the holder receivers 2,2 to receive a number of compact discs (CD) as disc-shaped memory as shown in FIG. 4; and a transfer device 6 in the transfer device receiver 3 of the housing 1 to transport the compact disc 4 in each of the holders 5,5 from the holder 5 to a transfer position "A" to another device, such as a tray 49 which is pulled out of a CD printer 48 behind the housing 1, and from the transfer position "A" to the holder 5. The transfer position "A" is provided at the lower left side, and its height may be determined depending on a height of a tray of another device to be connected.

As illustrated in FIG. 4, the holder 5 comprises a cylindrical CD storing portion 5a for receiving a number of stacked CD 4 and a handle 7 at the front surface, and an opening 8 is formed at the rear of the receiving portion 5a.

The housing 1 is wider than the holder 5, and is nearly equal to a diameter of the CD 4.

Figure 3:
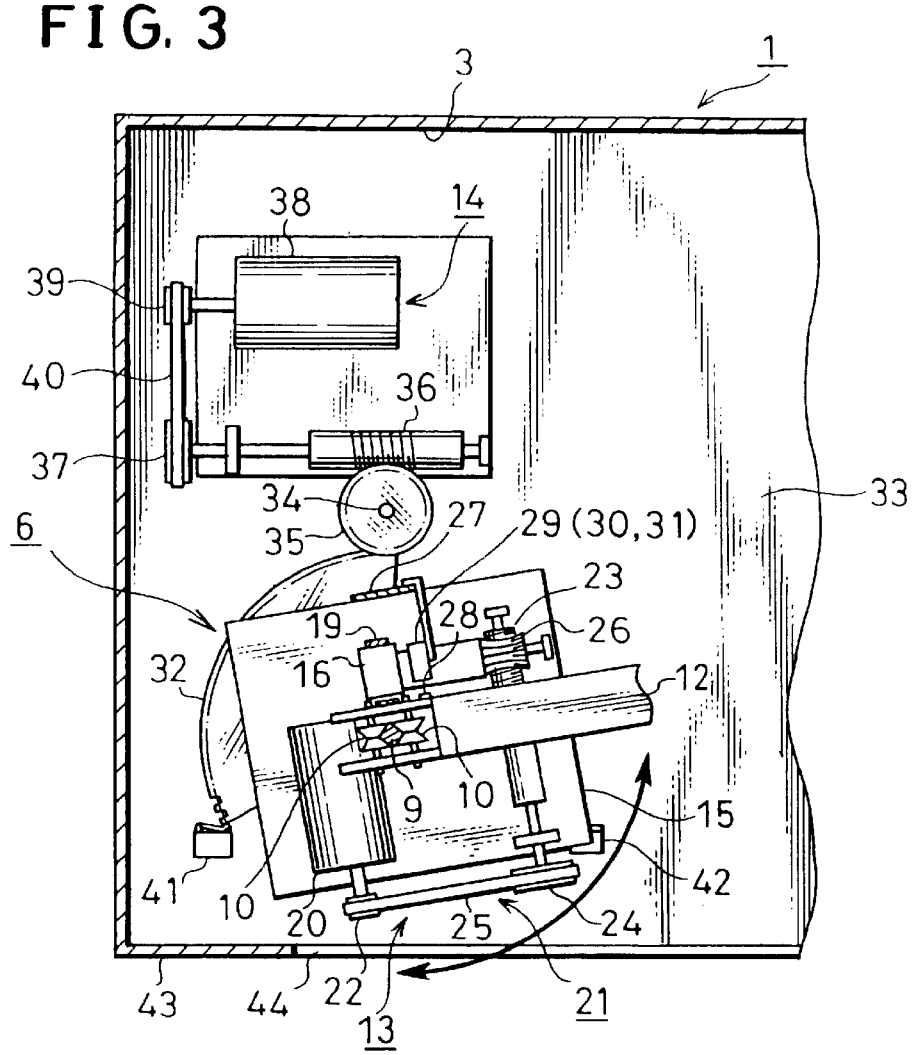
FIG. 3 is a horizontal sectioned plan view taken along the line III—III in FIG. 2.

As illustrated in FIGS. 2 and 3, the transfer device 6 comprises a vertical rectangular shaft 9 pivotally mounted at the upper and lower ends behind the holder receiver 2,2 in the housing 1; a horizontal arm 12 in which the proximal end is supported by a pair of V-recessed rollers 10,10 which pinch the vertical shaft 9 to move the arm 12 up and down, the arm 12 having a holding unit 11 at the distal end to hold the CD; an elevating unit 13 for elevating the arm 12 along the vertical shaft 9; and a turning unit 14 for turning the arm 12 with the vertical shaft 9.

The holding unit 11 comprises a known structure, for example, as disclosed in Japanese Patent Pub. No. 11-185306, which has a colletted elastic portion(not shown) for holding the CD by pressing the inner surface of a central bore 4a of the CD 4; and a pressing member (not shown) for pressing the lower surface of the elastic portion to bend the elastic portion elastically to decrease its diameter to release CD from the central bore 4a.

The elevating unit 13 comprises a drive pulley 16 pivotally mounted by a horizontal shaft on the upper surface of a horizontal plate 15 fixed to the lower end of the vertical shaft 9; a driven pulley 18 pivotally mounted on the lower surface of a horizontal plate 17 fixed to the upper end of the vertical shaft 9; an endless belt 19 wound between the two pulleys 16,18 and mounted to the arm 12; a pulse motor 20 on the lower horizontal plate 15 to rotate the driven pulley 18 normally and reversibly; and a transmitting unit 21 for transmitting rotational force of the motor 20 to the drive pulley 16.

The transmitting unit 21 comprises a pulley 22 fixed to a shaft of the motor 20; a pulley 24 fixed to the axial end of a worm 23 provided in parallel with the motor 20; an endless belt 25 wound around the two pulleys 22,24; and a worm wheel 26 integrally formed with the drive pulley 16 and engaged with the worm 23.

The arm 12 is elevated and lowered by the elevating unit 13 between an upper limit slightly upper the holder 5 in the upper holder receiver 2 and a predetermined lower limit.

At the upper, lower and intermediate positions of a vertical connecting piece 27 for connecting the upper and lower plates 17,15, when the arm 12 comes to the upper and lower limits and intermediate position slightly upper than the lower holder 5, there are provided height detecting sensors 29,30,31 such as a close sensor and a limit switch for detecting that the arm 12 comes to each of the positions by engaging with or getting close to the arm 12.

The turning unit 14 comprises a sector gear 32 fixed to the lower surface of the lower horizontal plate 15 or to the vertical shaft 9; a worm wheel 35 pivotally mounted to a bottom plate 33 of the housing 1 by a vertical shaft 34; a worm 36 pivotally mounted on the bottom plate 33 and engaged with the worm wheel 35; a pulley 37 mounted to the axial end of the worm 36; a reversible pulse motor 38 on the bottom plate 33; a pulley 39 mounted to the end of a shaft of the motor 38; and an endless belt 40 wound between the two pulley 37,39.

By the turning unit 14, the arm 12 turns together with the vertical shaft 9, the upper and lower horizontal plates 17, 15 and the connecting piece 27 between a forward position in which the distal end of the holding unit 11 matches the center of the CD 4 in the holder 5 of the holder receiver 2 as shown in FIG. 3, and a sideward position in which the holding unit 11 matches the transfer position "A" as shown in FIG. 1.

As shown in FIG. 3, on the bottom plate 33 of the housing 1, there are provided a first turning position detecting sensor 41 such as a limit switch for preventing further turning of the arm 12 by engaging with one side end of a sector gear 32 when the arm comes to the forward position, and a second rotation position detecting sensor such as a limit switch for preventing further turning of the arm 12 by engaging with the other side end of the sector gear 32 when the arm comes to the sideward position.

At the side surface of the housing 1, there is formed a F-shaped opening 44 which has two horizontal opening 44a,44b for allowing turning of the arm 12 at slightly upper position than the holders 5,5 of the upper and lower holder receivers 2,2, and a vertical opening 44c for allowing elevation of the arm 12 as directed sideward.

At the side surface of the housing 1, a transparent or translucent side cover 45 for covering the CD 4 and the arm 12 having the CD 4 at the transfer position "A" is detachably mounted.

Figure 5:
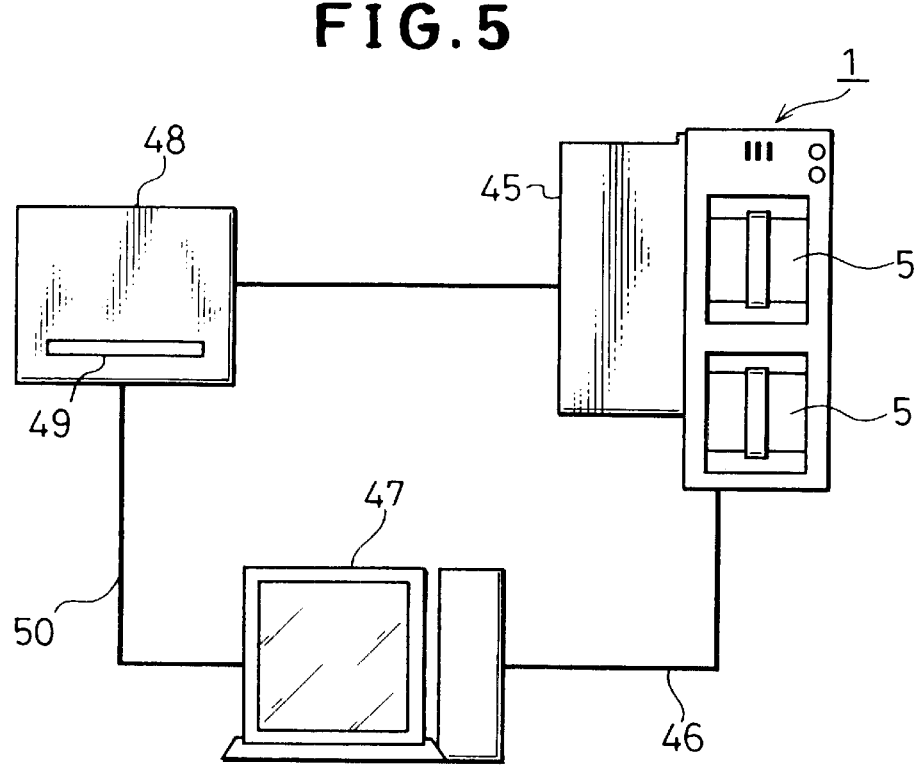
FIG. 5 is a schematic view which illustrates the feeder of the present invention connected to the printer and a computer.
Figure 6:
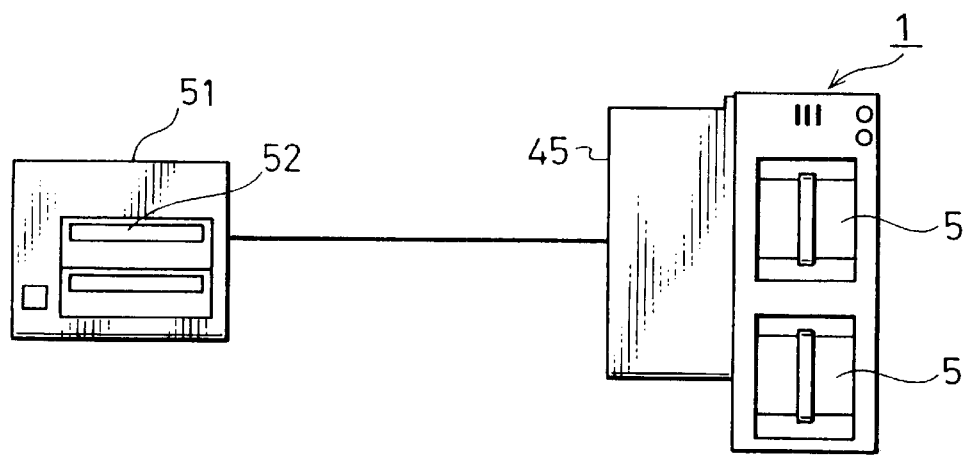
FIG. 6 is a schematic view of the embodiment of the present invention with a duplicator.

In the housing 1, there is provided a control (not shown) connected to a computer 47 via a cable 46 as shown in FIG. 5 to control the transfer device 6.

In the embodiments as shown in FIGS. 1, 2 and 5, when the tray 49 is pulled out of the CD printer 48, the printer 48 is positioned to allow the tray 49 to match the transfer position "A" exactly, and the control of the printer 48 is connected to the computer 47 via the cable 50, so that the printer 48 and the supply device are automatically controlled continuously.

On the central lower surface of the holding unit 11 or suitable position of the arm 12, there is provided a position detecting sensor (not shown) for memorizing the position of the arm 12 in a memory(not shown) by actuation owing to engagement or close location with another transfer means such as the tray 49 of the printer 48 while the arm 12 directed sideward is lowered.

In the control for the transfer device 6, there is provided movement control means for the arm 12, having learning function for actuating the transfer position detecting sensor to memorize a position of the arm 12 as transfer position into a memory, thereby controlling movement of the arm 12 based on the transfer position memorized into the memory thereafter.

Therefore, even if height of the transfer means such as the tray of another device to be connected is different, the optimum transfer position is memorized when the arm 12 comes towards the tray at first, so that movement of the arm 12 is controlled based on the transfer position thereafter, thereby avoiding necessity for resetting the optimum transfer position every time a device to be connected is replaced.

Operation of the embodiments will be described as below.

In the holder 5 of the upper holder receiver 2 of the feeder, a number of compact discs 4 (CD) before printing are stored, and the holder 5 of the lower holder receiver 2 remains empty. Continuous operation is inputted into the computer 47.

The tray 49 of the printer 48 is drawn to the transfer position "A", and then the arm 12 is lowered by the elevating unit 12. The highest CD 4 in the upper holder 5 is held by the holding unit 11, and elevated to the highest position in which the height detecting sensor 29 is actuated, and then the arm 12 is turned from the forward position to the sideward position by the turning unit 14. The arm 12 by which the CD 4 is held moves through the upper horizontal opening portion 44a of the opening 44.

After the arm 12 comes to the sideward position, the arm 12 is lowered to the transfer position "A" at which the height detecting sensor 30 actuates, and the holding unit 11 is released. The CD 4 is transferred to the tray 49 of the printer 48, and the arm 12 is elevated to a predetermined suitable position.

The tray 49 which receives the CD 4 is retracted into the printer 48 after the arm 12 is elevated, and the CD 4 is printed.

After completion of printing of the CD 4, the tray 49 is drawn out, and the arm 12 is lowered to the transfer position "A", at which the printed CD 4 is kept by the holding unit 11. The arm 12 is elevated to the intermediate position at which the height detecting sensor 31 is actuated, and the arm 12 is turned by the turning unit 14 from the sideward position to the forward position. The arm 12 which holds the CD 4 comes through the lower horizontal opening portion of the opening 44.

When the arm 12 comes to the forward position, the CD 4 held by the holding unit 11 is located right above the lower holder 5. The arm 12 is lowered to a predetermined height through the opening 8 of the lower holder 5. The printed CD 4 is released from the holding unit 11 and stored in the lower holder 5.

Thereafter, the arm 12 is elevated to the above intermediate height, and is turned sideward. The arm 12 is elevated to the highest position, and rotated to the forward position again. By repeating the operation, an unprinted CD 4 is taken out of the upper holder 5 one by one, and fed to the tray 49 of the printer 48, and the CD 4 which is printed and drawn from the printer 48 is stacked in the lower holder 5.

The disc memory may be CD-R, CD-RW or DVD instead of CD.

The holder 5 is not only equipped in the feeder, but also is used alone to store a number of CD. The handle 7 is advantageous for conveying, and the opening 8 may be used to find stored amount of the CD 4.

Figure 7:
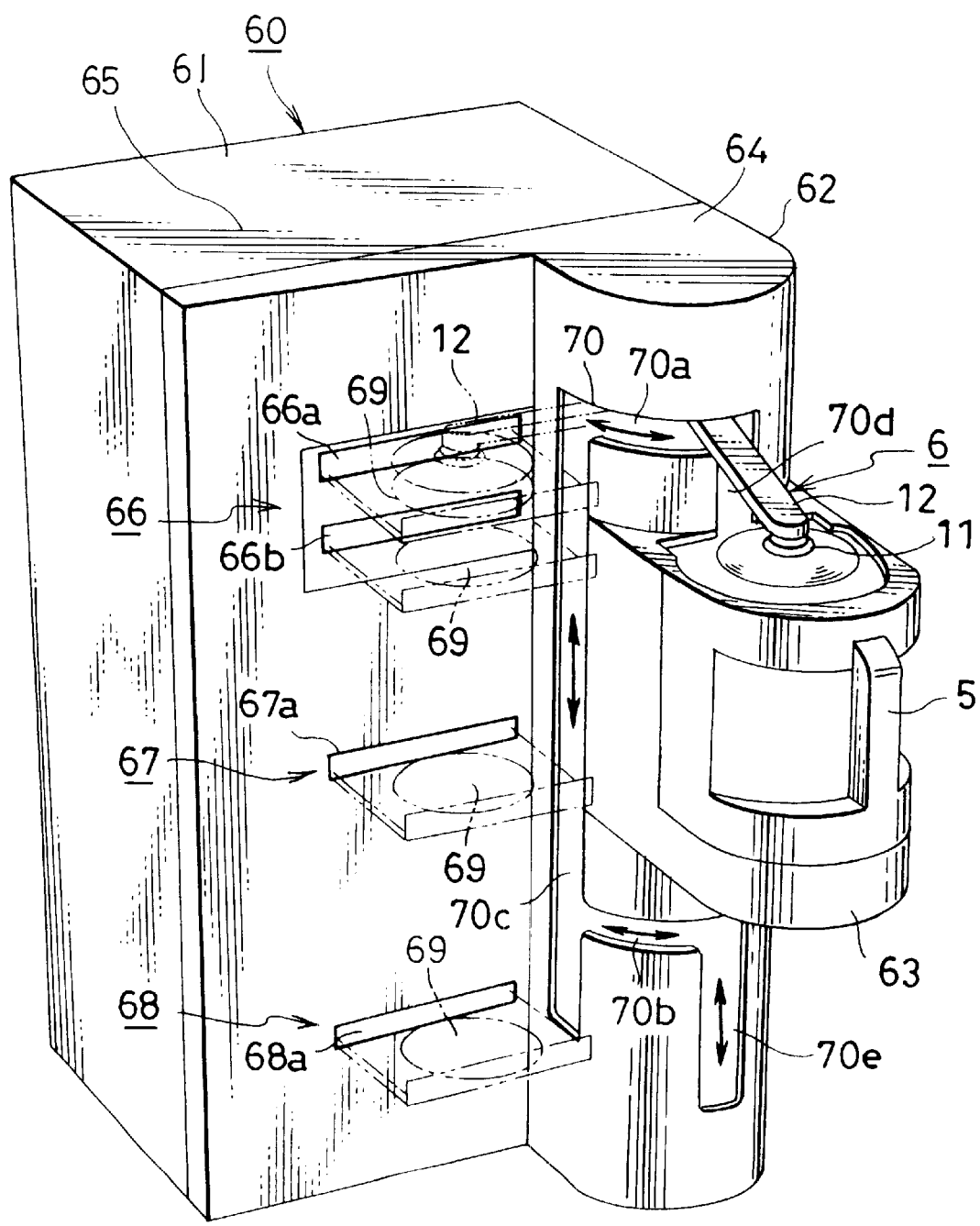
FIG. 7 is a perspective view of the second embodiment of the present invention.

FIG. 7 illustrates the second embodiment of the present invention. The same numerals are allotted to the same members as those in the first embodiment, and detailed description therefor is omitted.

In the second embodiment, a housing 60 comprises a rectangular portion 16 and a lobe 62 on the front surface. In the lobe 62, a holder receiver 63 is formed to receive a holder 5 which can be taken out of the receiver 62 and is similar to that in the first embodiment. A transfer device receiving portion 64 is formed in the lobe 2 and the rectangular portion 61 to receive a transfer device 6 similar to the above, and a processing unit receiving portion 65 is formed in a portion except the transfer device receiving portion 64 in the rectangular portion 61.

As processing unit, in this embodiment, a duplicator 66 and two CD label printers 67,68 are stacked. In trays 66a,66b,67a,68a which are drawn from the duplicator 66 and the printers 67,68, the centers of receiving portions 69 are formed to coincide with a holding unit 11 in which an arm 12 is directed sideward. The duplicator 66 and the printers 67,68 may be known structures, and their details are omitted.

On the lobe 62, an opening 70 is formed, and has horizontal opening portions 70a,70b at positions slightly upper and lower than the holder 5 in the holder receiver 63 to allow turning of the arm 12 between forward and sideward positions; a vertical opening portion 70c for allowing elevation of the sideward arm 12 between slightly upper potion than the upper tray 68a of the duplicator 66 and the tray 68a of the lower printer 68; and vertical opening portions 70d,70e which communicate with the horizontal opening portions 70a,70b.

At a sideward position in which the arm 12 is put through the vertical opening 70c, the arm 12 is lowered to heights at which the CD 4 is received to each of the trays 66a,66b, 67a,68a, and the heights are defined to the first receiving position, and the arm 12 is lowered through the lower vertical opening portion 70e to the second receiving position, in which the CD 4 completed as to reading and writing and printing of a label is sent to another conveying device(not shown).

The second embodiment achieves similar advantages to those in the first embodiment, and the duplicator 66 and the printers 67,68 are placed in the housing, thereby attaining fast automatic continuous treatment efficiently by a single device. Further, by avoiding problem that it is blocked by drawing the trays from the printers and duplicator to take CD out of the holder as disclosed U.S. Pat. No. 5,734,629, there is advantage.

In the second embodiment, the holder receiver 63 may be formed at the upper part of the front surface of the lobe 60, and the second receiving position is set under the position. But the holder receiving portion 63 may be provided at the lower portion of the front surface of the lobe 62, and the second receiving position may be provided above it.

The foregoing merely relate to embodiments of the invention. Various changes and modifications may be made by person skilled in the art without departing from the scope of claims wherein:

1. A compact disc feeder which comprises:
   a holder for storing a plurality of compact discs;
   a transfer device comprising a horizontal arm in which a proximal end is connected to a vertical shaft in the housing so that said arm may turn around the vertical shaft and elevate, a distal end of said arm having a holding unit which holds the compact disc, said transfer device further comprising an elevating unit for elevating said arm along the shaft, and a turning unit for turning said arm around the shaft; and
   a housing which includes said holder and said transfer device, said transfer device being capable of turning and elevating from said holder to a predetermined transfer position of the compact disc, said elevating unit comprising a drive pulley on a lower horizontal plate fixed to a lower end of the vertical shaft, a driven pulley pivotally mounted on a lower surface of an upper horizontal plate fixed to an upper end of the vertical shaft, an endless belt wound between the two pulleys, a pulse motor on the lower horizontal plate, and a transmitting unit for transmitting rotational force of the motor to the drive pulley.

2. A compact disc feeder as claimed in claim 1 wherein the transmitting unit comprises a pulley fixed to a shaft of the pulse motor, a pulley fixed to an axial end of a worm provided in parallel with the pulse motor, an endless belt wound around the two pulleys, and a worm wheel integrally formed with the drive pulley and engaged with the worm.

3. A compact disc feeder which comprises:
   a holder for storing a plurality of compact discs;
   a transfer device comprising a horizontal arm in which a proximal end is connected to a vertical shaft in the housing so that said arm may turn around the vertical shaft and elevate, a distal end of said arm having a holding unit which holds the compact disc, said transfer device further comprising an elevating unit for elevating said arm along the shaft, and a turning unit for turning said arm around the shaft; and
   a housing which includes said holder and said transfer device, said transfer device being capable of turning and elevating from said holder to a predetermined transfer position of the compact disc, said turning unit comprising a sector gear fixed to a lower surface of the lower horizontal plate or the vertical shaft, a worm wheel pivotally mounted on a bottom plate of the housing, a worm pivotally mounted on the bottom plate and engaged with the worm wheel, a pulley mounted to an axial end of the worm, a reversible pulse motor on the bottom plate, a pulley mounted to a shaft of the reversible pulse motor and an endless belt wound between the two pulleys.

4. A compact disc feeder which comprises:
   a holder for storing a plurality of compact discs;
   a transfer device comprising a horizontal arm in which a proximal end is connected to a vertical shaft in the housing so that said arm may turn around the vertical shaft and elevate, a distal end of said arm having a holding unit which holds the compact disc, said transfer device further comprising an elevating unit for elevating said arm along the shaft, and a turning unit for turning said arm around the shaft;
   a housing which includes said holder and said transfer device, said transfer device being capable of turning and elevating from said holder to a predetermined transfer position of the compact disc; and
   a plurality of holders which are stacked in the front of the housing, a vertical shaft being provided behind the holders, said arm turning between forward and sideward positions, the holding unit of the arm being matched with a center of the compact disc in the holder at the forward position of the arm, the sideward position of the arm being at the transfer position of the compact disc, an opening being formed at the side of the housing to allow turning and elevation of the arm which holds the compact disc.

5. A compact disc feeder as claimed in claim 4 wherein said opening comprises an F-shape which comprises upper and lower horizontal opening portions for allowing turning of the arm and a vertical opening portion for allowing elevation of the arm which is directed sideward.

6. A compact disc feeder which comprises:

a holder for storing a plurality of compact discs;

a transfer device comprising a horizontal arm in which a proximal end is connected to a vertical shaft in the housing so that said arm may turn around the vertical shaft and elevate, a distal end of said arm having a holding unit which holds the compact disc, said transfer device further comprising an elevating unit for elevating said arm along the shaft, and a turning unit for turning said arm around the shaft;

a housing which includes said holder and said transfer device, said transfer device being capable of turning and elevating from said holder to a predetermined transfer position of the compact disc; and height detecting sensors which are provided at an upper limit, an intermediate position and a lower limit respectively at a connecting piece for connecting upper and lower horizontal plate, the intermediate position being slightly upper than the lower holder, thereby detecting that the arm comes to each of the positions by engaging with or getting close to the arm.

* * * * *